INVENTORS
MILTON R. GRUDIN
HARALD R. JOHNSON
BY
*James and Franklin*
ATTORNEYS

United States Patent Office 3,448,358
Patented June 3, 1969

3,448,358
SERVO SYSTEM AND COMPUTER
Milton R. Grudin, Commack, and Harald R. Johnson, Huntington, N.Y., assignors to General Instrument Corporation, Newark, N.J., a corporation of Delaware
Filed Jan. 8, 1965, Ser. No. 424,328
Int. Cl. G05b 13/02; H02p 7/06, 7/36
U.S. Cl. 318—18                                17 Claims

ABSTRACT OF THE DISCLOSURE

A servo system for analog computational functions in which two series of signals are applied to spaced points on a delay line, and a signal detecting means is associated with and movable along the delay line between those points. The signal detecting means detects phase differences between the two applied signals as received by it and is positioned by means of a servo system so that the two signals detected by it are in a predetermined time relationship, the thus-determined position of the signal detecting means therefore being determined by the phase relationship between the signals applied at the spaced points rspectively.

---

The present invention relates to a servo system which may be employed for analog computational functions. More specifically it relates to a system capable of computing the relationship between any desired number of inputs and providing a useful output corresponding thereto.

Computers are known which will perform these functions but they are subject to a number of disadvantages, such as excessively complex electronic circuitry, a large number of moving parts, high cost, low resolution, and susceptibility to noise, to name only the most important. The problems in the prior art are particularly acute where the output is desired in the form of the position of a shaft, in which case a synchro-type servo system is generally utilized, said system involving the use of an electrical output signal fed to the output synchro and in accordance with which the latter is positioned. The system of the present invention has the following main advantages when compared with the conventional synchro-type systems: less cost, greater resolution, lower susceptibility to noise, cooler operation, greater stability, capability of analog computation with signals of constant amplitude, no quadrature problems at null, lighter weight, linear motion per degree of shaft rotation, lower power requirements, fewer moving parts, considerably higher mechanical gain with fewer components, and the elimination of summing amplifiers and networks for analog shaft position computations. Moreover, the system of the present invention produces very high output torque even though the input torques may be very low.

These advantages are achieved by utilizing a delay line as an important part of the summing and integrating section, and so associating that delay line with a power-driven output element as to cause the latter to move to desired position accurately and reliably. The delay line is provided with two spaced signal-producing means and a signal-detecting means positioned therebetween and adjustably movable along the line. The signal-producing means generate separate signals in the line, which are in turn detected by the detecting means. The position of the detecting means along the line is controlled by a motor which is in turn appropriately driven in accordance with the pair of detected signals. To this end a control means is operatively interposed between the detecting means and the motor, and that control means is sensitive to the relationship between the two individual signals as they reach the detecting means. In the preferred form here specifically disclosed the control means is effective to energize the motor so as to position the signal-detecting means along the delay line at a point where the two signals reaching it from the individual signal-producing means are in time coincidence. Thus any change in the time relationship between those two signals will cause the signal-detecting means to assume a new position in which, in effect, the signals detected thereby are nulled. Since the motor power can be independent of the magnitude of the signals, a very high degree of torque output can be produced.

The individual signals applied to the delay line may have their time relationships controlled either electrically or mechanically. Mechanically, the actual positions of the signal-producing means along the line may be altered. By electrical means their virtual positions may be altered. It has been found to be particularly desirable to utilize auxiliary delay lines to provide electrical means for changing said virtual positions, or in other words, for changing the time relationship of those signals as they are detected. Those auxiliary delay lines have their own signal-producing means and signal-detecting means whose relative positions along said auxiliary delay line are adjustable in accordance with the desired inputs. A common pulse source may be utilized for all of the signal-producing means. Where more than two inputs are to enter into the computation, a corresponding number of additional delay lines can be employed, the system of the present invention being extremely well adapted to computations involving a plurality of inputs of whatever number.

The output of the system can be of any desired character—a numerical readout can be produced or, by the motor-driven positioning of an appropriate part of an external electrical subassembly, an electrical output can be produced. The invention is here specifically illustrated with a mechanical numerical readout, but it will be understood that this is by way of exemplification only.

The components used in the system of the present invention are all relatively conventional and readily available—delay lines, amplifiers, AND-gates, flip-flops and the like. Accordingly, in the description to follow, these components will be illustrated more or less schematically, it being understood that the precise electrical or mechanical details of the individual components form no part of the present invention.

To the accomplishment of the above, and to such other objects as may hereinafter appear, the present invention relates to a computational servo system as defined in the appended claims and as described in this specification, taken together with the accompanying drawings, in which:

FIGS. 3 and 4 are illustrative diagrams showing the manner in which the two AND-gates operate to produce outputs when the signals fed thereto are not in time coincidence;

FIG. 5 is an illustrative diagram illustrating the action of an AND-gate when the signals fed thereto are in time coincidence.

Figure 1:
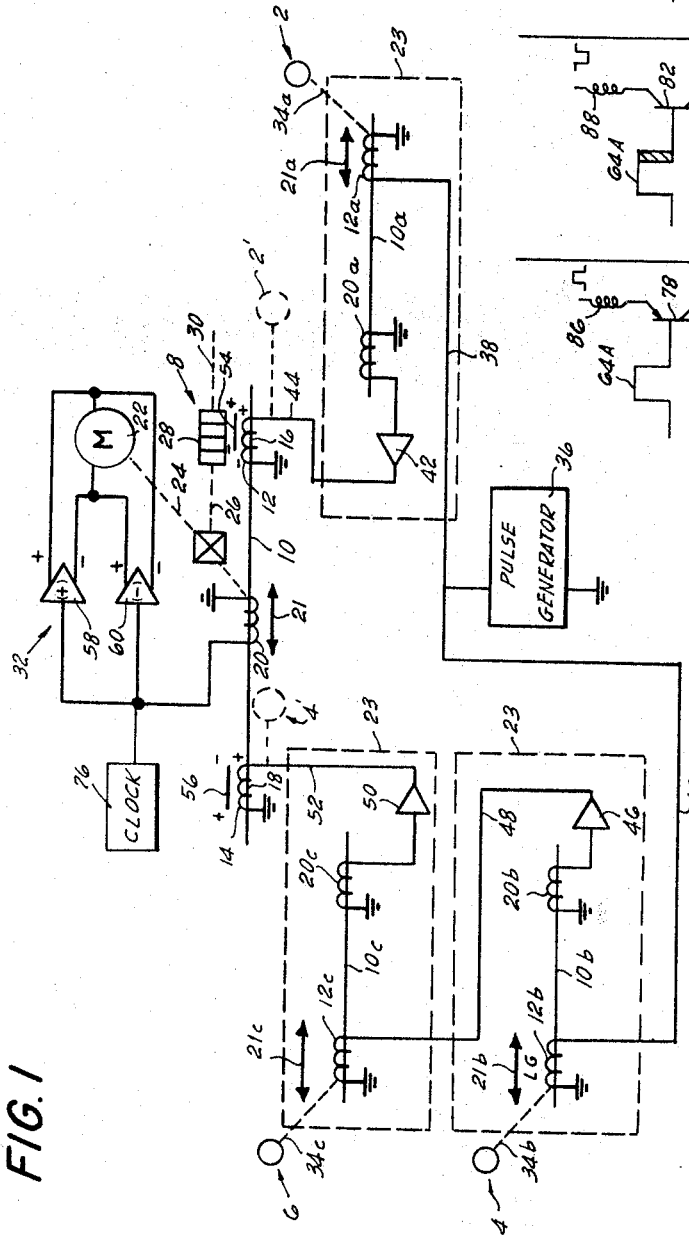
FIG. 1 is a schematic representation of one embodiment of the overall system designed for computing the relationship between three individual inputs.

The system of the present invention, as disclosed in FIG. 1, is designed to accommodate three inputs 2, 4 and 6 and produce an output at 8 constituting an integrated summation of the three inputs (the term "summation" being used to comprehend both addition and subtraction).

The basic computational assembly comprises a delay line 10, which is here specifically illustrated as being of the magnetostrictive type. A pair of primary signal-producing means 12 and 14, in the form of electrically energizable coils, are associated with the line 10 at points 16 and 18 respectively, which points 16 and 18 may (for an electrical time relationship control system) be fixed. A signal-detecting means 20 is also associated with the line 10 but is mounted so as to be movable along the line 10 between the signal-producing means 12 and 14, as indicated by the arrow 21. A motor 22 is operatively connected to the signal-detecting means 20 so as to move it along the line 10, the mechanical connection between motor 22 and means 20 being indicated by the broken line 24. Typically, the line 24 would represent a shaft driven by the motor 22 and gearing or linkages mechanically connected to the means 20. The mechanical position of the mechanical connection 24 (e.g. the rotational position of the motor shaft) constitutes the output of the system, and may be connected in any suitable manner, as indicated by the broken line 26, to a readout counter 28, and, alternatively or in addition, connected by means indicated by the broken line 20 to any other desired output instrumentality.

Figure 2:
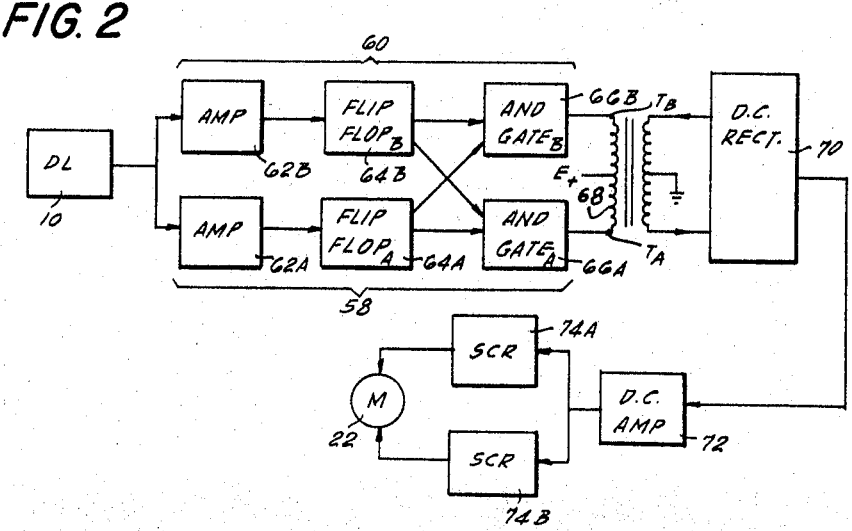
FIG. 2 is a schematic circuit diagram showing in greater detail the control system for the driving motor.

Operatively connected between the signal-detecting means 20 and the motor 22 is control means generally designated 32, and illustrated in more detail in FIG. 2. The two signals produced in the delay line 10 by the signal-producing means 12 and 14 respectively move along the line 10 and are detected by the means 20. The control means 32 is effective to sense the time relationship between the two signals as detected by the means 20 and to position the means 20 along the line 10 so that both signals are detected by it in time coincidence. Thus the position of the detecting means 20, and hence the output of the motor 22, is determined (when the positions of means 12 and 14 are fixed) by the time relationship between the signals generated in the line 10 by those means 12 and 14 respectively. If those signals are generated simultaneously, the detecting means 20 will be positioned midway between the means 12 and 14. If one of those signals is generated before the other, the detecting means 20 will be moved along the line 10 in a direction away from whichever of the means 12 or 14 generates the earlier signal, the distance which the detecting means 20 moves along the line 10 in that direction being proportional to the time differential between the generation of the two signals.

It will be appreciated, therefore, that the output from the motor 22 can be made to represent the summation of a pair of inputs if those inputs are converted into the time relationship between the signals produced by the means 12 and 14. Where the desired inputs already exist in terms of a time relationship between electrical signals, those signals can be applied directly, in an energizing sense, to fixed signal producing means 12 and 14. Where, as is usually the case, the inputs are not in the form of time relationships between electrical signals, means must be provided for converting those inputs into such a timed relationship. In accordance with a further aspect of the present invention, delay lines are used for this purpose as well. Where, as is here specifically disclosed, three inputs 2, 4 and 6 are involved, each is provided with its own auxiliary delay line 10a, 10b and 10c respectively. Each of these auxiliary lines is provided with an auxiliary signal-producing means 12a, 12b and 12c respectively, and with an auxiliary signal-detecting means 20a, 20b and 20c respectively. The individual inputs 2, 4 and 6 are operatively connected, by any appropriate means represented by the broken lines 34a, 34b and 34c respectively, to their respective auxiliary delay line assemblies in such a manner as to be effective to change the spacing between the auxiliary signal-producing means 12 and signal-detecting means 20 corresponding thereto. As here specifically disclosed the auxiliary signal-detecting means 20 are all fixedly positioned relative to their respective auxiliary lines 10, while the auxiliary signal-producing means 12 are all movable along their respective auxiliary lines 10, in the direction of the arrows 21a, 21b and 21c respectively, in accordance with the inputs 2, 4 and 6 respectively.

A pulse generator 36, effective to produce repetitive pulses at a predetermined repetition frequency, is connected by line 38 to the auxiliary signal-producing means 12a and by line 40 to the auxiliary signal-producing means 12b. The output from the signal-detecting means 20a is connected by amplifier 42 and line 44 to the primary signal-producing means 12 on the line 10. The output from the signal-detecting means 20b is connected by amplifier 46 and lead 48 to the auxiliary signal-producing means 12c, and the output of the signal-detecting means 20c is connected by amplifier 50 and line 52 to the other primary signal-producing means 14. The amplifiers 42, 46 and 50 may be designed to make up for losses in their associated delay lines and windings.

Hence it will be appreciated that the pulse signals which start on their way to the primary signal-producing means 12 and 14 from the pulse generator 36 are initially in time coincidence. However, the time relationship between the generation of the pulse at the generator 36 and the reception of the pulse at the primary signal-producing means 12 will be determined by the spacing between the means 12a and 20a on auxiliary line 10a, and this in turn will be controlled by the input 2. Similarly, the time relationship between the generation of the pulse at the generator 36 and the reception of the pulse at the primary signal-producing means 14 will be determined by the spacing between the means 12b and 20b and by the spacing between the means 12c and 20c along their respective auxiliary lines, and those spacings will in turn be determined by the inputs 4 and 6 respectively. Thus the time relationship between the signals generated in the line 10 by the primary signal-producing means 12 and 14 respectively will be determined by the inputs 2, 4 and 6, the input 2 determining the time phase of the signal produced by primary means 12 and the inputs 4 and 6 combining in a summation manner to determine the time phase of the signals generated by primary means 14. As has already been seen, the signal-detecting means 20 will be positioned in accordance with the time relationship of the signals generated by the means 12 and 14, and hence it follows that it will be positioned in accordance with the summation of inputs 2, 4 and 6.

The operation of the disclosed system may be mathematically analyzed as follows. If $X_1$, $X_2$ and $X_3$ are the positions along the line 10 of the means 12, 20 and 14 respectively, and if the signal-producing means 12 and 14 are simultaneously energized, then $X_2$, the position of the signal-detecting means when it is positioned so as to receive the two signals simultaneously, will be represented by $X_2 = \frac{1}{2}(X_1 + X_3)$. Thus the line 10 alone can be used to produce an analog addition function if the positions of the signal-producing means 12 and 14 are physically shifted therealong in accordance with a pair of inputs. (Such mechanical positioning of the means 12 and 14 is schematically indicated in FIG. 1 by the broken lines designated 2' and 4' respectively.) In accordance with the form of the invention shown in solid lines in FIG. 1, in which independent electrical delay is applied to the signals produced by the means 12 and 14, those electrical delays can be expressed as $D_1$ and $D_3$, representing the positional equivalent of those delays on the line 10. The virtual positions $X_1'$ and $X_3'$ of the means 12 and 14 can then be expressed as $X_1 - D_1$ and $X_3 + D_3$ respectively. Hence the position $X_2$ of the detecting means 20 at null can be represented as $\frac{1}{2}(X_1 + X_3 - D_1 + D_3)$. Either $X_1'$ or $X_3'$ or both can themselves represent a combination of a plurality of inputs. Thus $X_1'$, as disclosed in FIG. 1, represents only the input 2, whereas $X_3'$ represents the sum of the inputs 4 and 6.

Each of the secondary delay lines 10a, 10b and 10c with their associated coils, amplifiers and coil positioning means, can comprise standard modules (as indicated by the broken line enclosures 23 in FIG. 1), and it will be appreciated that as many of those modules may be interconnected and used as are required for the accomplishment of any desired computational task. Moreover, since the only connections from one module to another and from the modules to the output assembly (defined by the delay line 10, the motor 22 and the control means 32) are all-electrical, any one or all of these units may be located remotely from the others without sacrifice of operational characteristics.

As had been indicated, the position of the signal-detecting means 20 along the line 10 is made such that it receives the signals generated by the means 12 and 14 in time coincidence. In accordance with the embodiment here specifically disclosed the signals produced by the means 12 and 14 are of opposite sign, in order that they may be readily differentiated by the detecting means 20. Hence there is associated with the means 12 (and with the line 10) a biasing magnet 54 the negative end of which is directed toward the means 14, and there is associated with the means 14 (and with the line 10) a biasing magnet 56 the negative end of which is directed toward the means 12, the magnets 54 and 56 therefore opposing one another. The means 12 and 14 are so wound as, when energized, to have positive magnetic polarity at their right-hand ends and negative magnetic polarity at their left-hand ends as viewed in FIG. 1. Thus, the means 12 will send a negative signal down the line 10, moving from right to left, while the means 14 will send a positive signal down the line 10, moving from left to right.

The control means, only generally shown in FIG. 1, comprises a pair of differentiating amplifier assemblies 58 and 60 adapted to be actuated respectively when the positive signal detected by the means 20 precedes the negative signal detected thereby and vice versa respectively. Each of the differentiating amplifiers 58 and 60 are connected to one another and to the motor 22 in such a sense that when the positive signal (emanating from the signal-producing means 14) is detected before the negative signal (emanating from the signal-producing means 12) the motor 22 is energized in such a sense as to move the signal-detecting means 20 toward the signal-producing means 12. The differentiating amplifier assembly 60 is oppositely active. When a given amplifier assembly 58 or 60 is energized it will cut off the other, and when both positive and negative signals are received simultaneously, neither of the amplifier assemblies 58 or 60 will be energized—both will be cut off. When this latter condition exists, the motor 22 will stop and the position of the signal-detecting means 20 along the line 10 will have been determined by the time relationship between the positive and negative signals.

The control system 32 is shown in more detail in FIG. 2, where block DL represents the delay line 10. The differentiating amplifier assembly 58 comprises, in series connection, an amplifier 62A, a flip-flop 64A and an AND-gate 66A. The differentiating amplifier assembly 60 comprises an amplifier 62B, a flip-flop 64B, and an AND-gate 66B. As indicated, flip-flop 64A is connected to both of the AND-gates 66A and 66B, as is flip-flop 64B. The outputs of the two AND-gate 66A and 66B are fed through center tap transformer 68 to a DC rectifier 70, the output of which is amplified at 72 and fed to a selected one of a pair of silicon controlled rectifiers 74A and 74B, depending upon the polarity of the output of the amplifier 72, thereby to cause the motor 22 to rotate in one direction or the other. A clock circuit 76, producing a reset signal for the flip-flops 64A and 64B, is connected to the circuitry in any appropriate manner, as indicated in FIG. 1.

When a positive signal is detected by the means 20, the flip-flop 64A will be converted from its "high" to its "low" condition. When a negative signal is detected the flip-flop 64B will be converted from its "low" condition' 'condition to its "high" condition. The flip-flops 64A and 64B are periodically reset to their "high" and "low" conditions respectively by the signal from the clock 76. The AND-gate 66A comprises a pair of transistors 78 and 80, the base of the transistor 78 being connected to the output of the flip-flop 64A and the base of transistor 80 being connected to the flip-flop 64B. Similarly, the AND-gate 66B comprises a pair of transistors 82 and 84, the base of transistor 82 being connected to the output of flip-flop 64A, and the base of transistor 84 being connected to the output of flip-flop 64B. In series with the transistors 78 and 80 of AND-gate 66A is primary winding 86 of the transformer 68, and in series with the transistors 82 and 84 of AND-gate circuit 66B is primary winding 88 of the transformer 68. As may be seen from a comparison of FIGS. 3, 4 and 5, AND-gate 66A will be conductive only for that period of time when the outputs from both of the flip-flops 64A and 64B are in their "low" condition, that period of time being represented by the shaded portion in FIG. 3. AND-gate 66B will be conductive only when the outputs from both of the flip-flop circuits 64A and 64B are in their "high' condition, that period of time being represented by the shaded portion in FIG. 4. As indicated in FIG. 5, which is representative of both gates 66A and 66B, when the outputs of the flip-flops 64A and 64B are one "high" and one "low" the AND-gates 66A and 66B will not be conductive.

Figure 6:
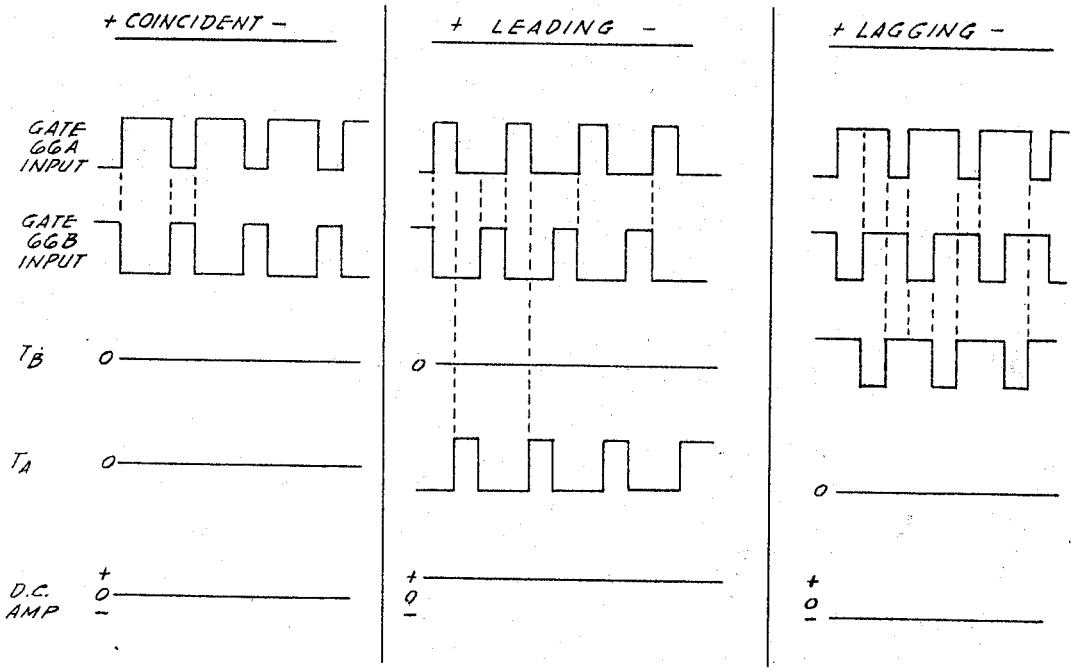
FIG. 6 is a diagram illustrating the voltages at various points in the control circuit under various operating conditions.

Hence, as indicated in FIG. 6, when the positive and negative signals generated in line 10 by the means 14 and 12 respectively are received simultaneously by the signal-detecting means 20, the inputs to AND-gates 66A and 66B will be such as to make those gates non-conductive, the voltages at points $T_A$ and $T_B$ on transformer 68 will be at zero potential, and there will be no output from the DC amplifier 72. Consequently the motor 22 will be stationary. If the positive signal is received before the negative signal, AND-gate 66B will be rendered non-conductive, while at the same time AND-gate 66A will be rendered conductive and a positive-going pulse will be produced at point $T_A$, thus causing the DC amplifier 72 to have a positive output which will actuate silicon controlled rectifier 74A and cause the motor 22 to rotate in such a direction as to move the signal-detecting means 20 along the line 10 in a direction toward the source of the negative signal, the signal-producing means 12. If the negative signal is received first, the operation of the control circuit 32 will be such as to block AND-gate 66A, render AND-gate 66B conductive, and produce a negative-going pulse at point $T_B$, thereby causing the DC amplifier 72 to have a negative output, thereby causing the motor 22 to rotate in the opposite direction.

It is preferred that the differentiating amplifier assemblies 58 and 60 be so biased as to operate only on the top 10% of the signals detected by the means 20. In this way a high signal-to-noise ratio is attained, and servo hunting or spurious noise triggering will be minimized.

Only minimal input force is required—that sufficient to move the secondary signal producing means 12a, 12b and 12c along their respective auxiliary delay lines. The output force is virtually unlimited, being determined solely by the design of the motor 22 and the DC amplifier 72 which feeds it. Thus tremendous mechanical gain can be accomplished. Since the delay line 10 (and the auxiliary delay lines 10a, 10b and 10c) are all inherently continuous, a very high degree of resolution may be achieved. The null-positioning of the detecting means 20 is positive in operation, and the motor 22 is completely de-energized when the null condition is reached, so that there are no quadrature problems at the null condition, and there are no problems of heat dissipation if the system remains energized for a long period of time while at the null position. The circuitry can be designed so as to be very insensitive to noise. Input signals of constant amplitude may be utilized, with analog computation still rendered possible. Such electronic circuitry as is employed is not only conventional but also quite simple. Fewer moving parts are involved than in a standard synchro-type servo mechanism. A linear output can be produced—the positioning of the detecting means 20 can be linearly related to the output shaft rotation of the motor 22—or any desired degree of non-linearity can be produced through the use of an appropriate intervening mechanical subassembly. The system lends itself to a modulator approach, with a single output assembly (10, 12, 14, 20, 22, 32) useable with any desirable number of readily interconnected modules, and the individual modules can be individually remotely positioned if desired.

It will be understood that either one or both of the signal-producing means 12 and 13 could be operatively connected to the motor 22 in place of, or in addition to, the signal-detecting means 20, since what is involved in causing the signal-detecting means 20 to detect the two signals in timed coincidence (or in any other predetermined timed relationship) is the relative positions of the means 12, 14 and 30 along the line 10 (in conjunction with the timed relationship between the signals produced by the means 12 and 14), and that the relative spatial relationship between the means 12, 14 and 20 can be varied by shifting the position of any one of those means or of any plurality of those means along the line 10.

While but a limited number of embodiments of the present invention have been here specifically disclosed, it will be apparent that many variations may be made in the details thereof, all within the scope of the instant invention as defined in the following claims.

We claim:

1. A servo system which may be employed for computational functions comprising, in combination, a delay line, first and second primary signal producing means operatively connected thereto and active to substantially simultaneously apply two timed signals to said line respectively at first and second spaced zones thereon, a signal detecting means operatively connected to said line at a third zone between said first and second zones and active to detect signals in said line at said third zone, moving means operatively connected to said signal detecting means for changing the position of said third zone along said line, control means operatively connected between said signal detecting means and said moving means and active to move said third zone along said line to a position where said timed signals applied to said line at said first and second zones respectively are detected at said third zone in a predetermined time relationship, and means for sensing the position of said third zone along said line.

2. The combination of claim 1, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to said second signal producing means.

3. The combination of claim 1, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to said second signal producing means and to said other of said primary signal producing means.

4. The combination of claim 1, in which each of said primary signal producing means comprises energizable means operatively connected to said line and effective to produce a signal in said line at the corresponding one of said first and second zones, and energizing means operative connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to both of said second signal producing means associated respectively with said first and second primary signal producing means.

5. The combination of claim 1, in which said control means comprises a pair of oppositely sensed phase-detecting networks each having an input connected to said signal detecting means and an output connected to said moving means, the output of each of said networks being effective to energize said moving means in opposite senses respectively.

6. The combination of claim 5, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to said second signal producing means.

7. The combination of claim 5, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone point so as to produce a delay spacing between the application and detection of said second signal, means for connecting the output of said second signal detecting means to said energizable means, means for varying the delay spacing between said second signal producing means and said second signal detecting means, and a signal source operatively conected to said second signal producing means and to said other of said primary signal producing means.

8. The combination of claim 7, in which each of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to both of said second signal producing means associated respectively with said first and second primary signal producing means.

9. The combination of claim 1, in which said control means comprises a pair of oppositely sensed phase-detecting networks each having an input connected to said signal detecting means and an output connected to said moving means, the output of each of said networks being effective to energize said moving means in opposite senses respectively, and operative connecting means between said networks effective upon the detection of the appropriate signal phase relationship by one of said networks to deenergize the other of said networks.

10. The combination of claim 9, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between second signal producing means and said second signal detecting means, and a signal source operatively connected to said second signal producing means.

11. The combination of claim 9, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to said second signal producing means and to said other of said primary signal producing means.

12. The combination of claim 9, in which each of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone point and detect a signal in said second line at another zone spaced from said one zone so as to produce a delay spacing between the application and detection of said second signal, means for connecting the output of said second signal detecting means to said energizable means, means for varying the delay spacing between said second signal producing means and said second signal detecting means, and a signal source operatively connected to both of said second signal producing means associated respectively with said first and second primary signal producing means.

13. A servo system which may be employed for computational functions comprising, in combination, a delay line, first and second primary signal producing means operatively connected thereto and active to substantially simultaneously apply two timed signals to said line respectively at first and second space zones thereon, a signal detecting means operatively connected to said line between said first and second zones and active to detect signals in said line at a third zone corresponding to the location of said signal detecting means along said line, means for mounting said signal detecting means so that it is movable along said line, moving means operatively connected to said signal detecting means for moving it along said line, control means operatively connected between said signal detecting means and said moving means and active to move said signal detecting means along said line to a position where said timed signals applied to said line at said first and second points respectively are detected at said third zone in a predetermined timed relationship, and means for sensing the operative position of said signal detecting means along said line.

14. The combination of claim 13, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay between the application and detection of said second signal, means for connecting the output of said second signal detecting means to said energizable means, means for varying the spacing between said second signal producing means and said second signal detecting means along said second delay line, thereby to vary the signal delay between said second signal producing means and said second signal detecting means, and a signal source operatively connected to said second signal producing means.

15. The combination of claim 13, in which one of said primary signal producing means comprises energizable means operatively connected to said line and effective to produce a signal in said line at the corresponding one of said first and second zones, and energizing means operatively connected to said energizable means for energizing the latter, said energizing means comprising a second delay line with a second signal producing means and a second signal detecting means operatively connected thereto and active to respectively apply a signal to said second line at one zone and detect a signal in said second line at another zone spaced from said one zone so as to produce a delay between the application and detection of said second signal, means for connecting the output of said second signal detecting means to said energizable means, means for varying the spacing between said second signal producing means and said signal detecting means along said second delay line, thereby to vary the signal delay between said second signal producing means and said second signal detecting means, and a signal source operatively connected to said second signal producing means and to said other of said primary signal producing means.

16. The combination of claim 13, in which said control means comprises a pair of oppositely sensed phase-detecting networks each having an input connected to said signal detecting means and having an output connected to said moving means, the output of each of said networks being effective to energize said moving means in opposite senses respectively.

17. A servo system which may be employed for computational functions comprising, in combination, a delay line, first and second primary signal-producing means operatively connected thereto and active substantially simultaneously to apply two timed signals to said line respectively at first and second spaced zones thereon, a signal-detecting means operatively connected to said line at a third zone between said first and second zones and active to detect signals in said line at said third zone, moving means operatively connected to at least one of said previously mentioned means for moving the latter, and the zone corresponding thereto, along said line relative to said others of said previously mentioned means and the zones corresponding thereto, control means operatively connected between said signal-detecting means and said moving means and active to actuate said moving means to cause the relative positions of said previously mentioned means along said line to vary so that said timed signals applied to said line at said first and second zones respectively are detected at said third zone in a predetermined time relationship, and means for sensing the relative positions of said previously mentioned means along said line.

References Cited

UNITED STATES PATENTS

| | | | |
|---|---|---|---|
| 2,680,241 | 6/1954 | Gridley | 340—206 |
| 2,863,120 | 12/1958 | Powell | 332—9 |
| 3,007,637 | 11/1961 | Meirowitz | 235—92 |
| 3,008,087 | 11/1961 | Darwin | 328—72 |

MAYNARD R. WILBUR, *Primary Examiner.*

GARY R. EDWARDS, *Assistant Examiner.*

U.S. Cl. X.R.

318—28; 333—30